United States Patent [19]

Rother et al.

[11] Patent Number: 4,515,547

[45] Date of Patent: * May 7, 1985

[54] APPARATUS FOR THE MANUFACTURE OF CONICAL HOLLOW POLES OF FIBER REINFORCED SYNTHETIC RESIN

[75] Inventors: Brüno Rother, Neumarkt; Hartmut Trommen, Postbauer-Heng, both of Fed. Rep. of Germany

[73] Assignee: G.A. Pfleiderer GmbH & Co. KG, Neumarkt, Fed. Rep. of Germany

[*] Notice: The portion of the term of this patent subsequent to May 17, 2000 has been disclaimed.

[21] Appl. No.: 463,084

[22] Filed: Feb. 2, 1983

[30] Foreign Application Priority Data

Dec. 30, 1982 [EP] European Pat. Off. ........ 82112108.4

[51] Int. Cl.³ .................................................. B29C 5/04
[52] U.S. Cl. ..................................... 425/215; 264/257; 264/311; 425/435
[58] Field of Search .............. 264/257, 258, 310, 311, 264/302, 270; 425/215, 216, 217, 73, 74, 75, 8, 435

[56] References Cited

U.S. PATENT DOCUMENTS

| | | | |
|---|---|---|---|
| 2,915,425 | 12/1959 | Biedebach et al. | 264/311 |
| 2,994,919 | 8/1961 | Schafer et al. | 264/311 |
| 3,150,219 | 9/1964 | Schmidt | 264/311 |
| 3,290,426 | 12/1966 | Barrentine | 264/311 |
| 3,900,355 | 8/1975 | Goto et al. | 264/311 |
| 4,002,714 | 1/1977 | Usui | 264/311 |
| 4,383,965 | 5/1983 | Rother et al. | 264/311 |
| 4,412,964 | 11/1983 | Todd et al. | 264/8 |

*Primary Examiner*—Jay H. Woo
*Assistant Examiner*—James C. Housel
*Attorney, Agent, or Firm*—Jordan and Hamburg

[57] ABSTRACT

This invention relates to an apparatus for the manufacture of conical hollow poles with an essentially circular cross-section, made of fiber reinforced synthetic resin, in which the fiber reinforcement is wound off from a carrying tube which is introduced into the mold, attaches itself onto the interior wall of the mold and is saturated by the synthetic resin which is injected into the mold from one end, with the nozzle being guided approximately longitudinally to the mold and with a light source arranged on the opposite end of the mold illuminating the interior of the mold, the inside diameter of which corresponds to the predetermined inside diameter of the pole at the pole bottom.

10 Claims, 8 Drawing Figures

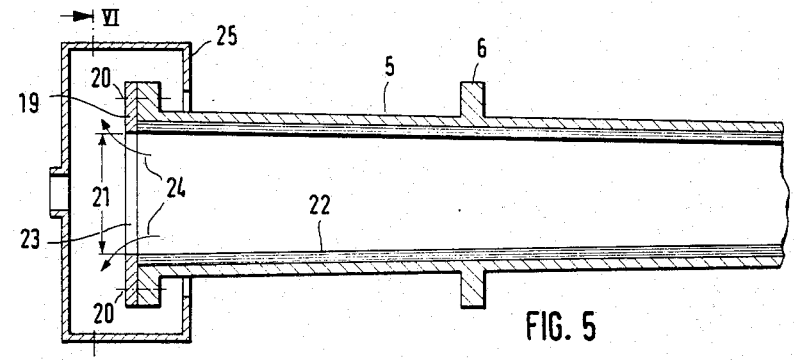
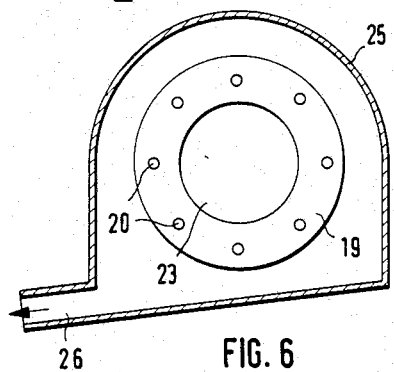
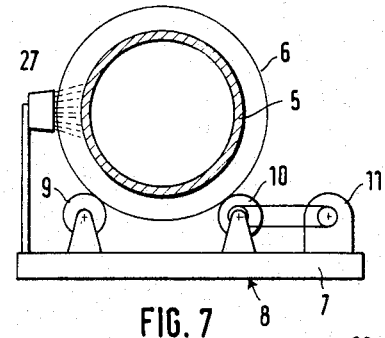
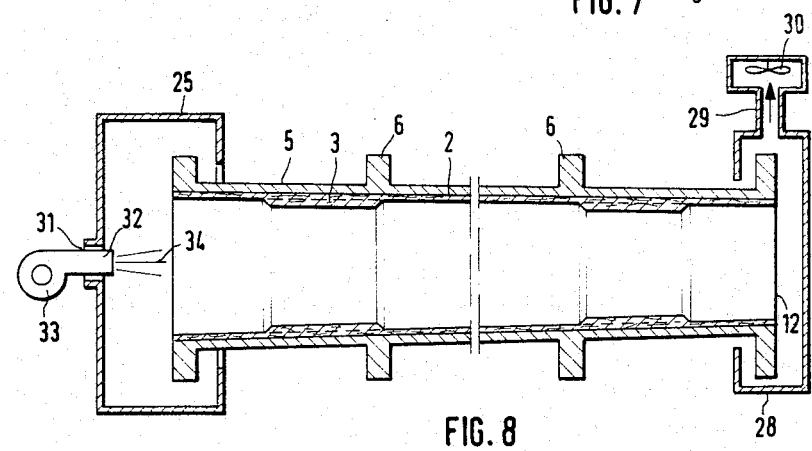
FIG. 5
FIG. 6　　FIG. 7
FIG. 8

APPARATUS FOR THE MANUFACTURE OF CONICAL HOLLOW POLES OF FIBER REINFORCED SYNTHETIC RESIN

BACKGROUND OF THE INVENTION

This invention relates to an apparatus for the manufacture of conical hollow poles with an essentially cylindrical cross-section and made of fiber reinforced synthetic resin, in which the fiber reinforcement is unrolled from a carrying tube inserted into the mold, applied onto the interior wall of the mold and saturated by the synthetic resin which is injected into the mold from one end.

Poles of fiber reinforced synthetic resin are preferably manufactured by centrifugal techniques, that is, a reinforcement of glass fiber or mineral or textile fibers is first made into a conical mold. This mold is placed onto a centrifugal machine by means of carrying rolls and rotated. During rotation, synthetic resin is poured into the mold, completely saturating the reinforcement and forcing it in an outward direction because of the centrifugal force involved and applying it onto the interior walls of the mold. Poles manufactured by this system have proved to be very good. They can be dyed throughout the entire cross-section in various colors and are especially scratch-resistant. They are not susceptible to corrosion and need no care. The material is self-isolating, eliminating the risk of electrical accidents. In traffic accidents when the pole is hit by vehicles, personal and material damages have been found to be much reduced compared to cases involving poles made of steel or concrete.

An important advantage of the centrifugal technique lies in the fact that the reinforcement can be further strengthened at optional places by introducing, for example, one or more additional layers of glass fibers. Such additional reinforcement can be provided wherever a subsequent service door is to be cut out or where additional lights, loud-speakers or the like are to be positioned.

Heretofore, it has been difficult to saturate poles, which were to be provided with additional fiber reinforcement, in such a way that the required wall thickness is present at all places of the pole with the fibers being correctly and completely saturated by the synthetic resin. A filling procedure is known, in which the synthetic resin is poured into the mold from the top and without pressure. Because of the conical shape of the mold, the synthetic resin moves towards the larger cross-section. In another system, a filler channel is introduced into the mold in its longitudinal direction, out of which the synthetic resin flows during the rotation process. The disadvantage of this filling technique is that the fiber reinforcement, being of uneven thickness, cannot be saturated in a reliable fashion.

Attempts have therefore been made to introduce the synthetic resin by a filling lance which is placed into the mold in its longitudinal direction. With the lance enabling a variable, controlled filling, the glass mats can be saturated in a perfect fashion according to their various thicknesses; however, such filling lances have the disadvantage that they are not suitable for molds with a small cross-section and considerable lengths.

A method is further known, in which the entire centrifugal machine is positioned obliquely with the mold, so that the synthetic resin can be distributed in its longitudinal direction and according to the inclination of the mold. This method has the disadvantage that, in the case of high speed of rotation used in modern centrifugal techniques, the resin moves towards the bottom of the pole in spite of the oblique position resulting in a strong resin concentration there. This leads to undesired amounts of resin and larger wall thicknesses at the bottom of the pole which crack during shrinking thus lowering the stability of the product.

Finally, a tempering process for centrifuged synthetic resin poles is part of the modern technique. In this process, either the entire system of the centrifugal machine and mold is placed in a closed container, for example an autoclave, and heated. This results in disproportionately high costs. A different tempering method therefore provides for the removal of the pole from the mold following pre-polymerization of the synthetic resins and for its subsequent hardening in a special oven. Both tempering methods are relatively costly and it is difficult to remove the harmful vapors which occur during the polymerization process.

Accordingly, it is an object of the present invention to manufacture a pole in which fiber reinforcement, having various thicknesses and spread according to static or dynamic needs, can be perfectly saturated by synthetic resin and in which the danger of crack formations at the bottom end is eliminated by appropriate measures. In this connection, it is an object of the invention to assure a perfect tempering and hardening of the pole by technically uncomplicated means and to remove the harmful vapors from the production area.

These objects are achieved, according to the invention, by an apparatus of the initially described type in which the nozzle with the injection stream is guided approximately in the longitudinal direction of the mold and a light source is arranged at the opposite end of the mold illuminating the interior of the mold and a ring flange is fastened to the bottom end of the mold, the interior diameter of which corresponds to the predetermined interior diameter of the pole at the pole bottom.

In this method, the reinforcement is introduced into the mold via a carrying tube. This, in itself, is already known. One or several fiber mats are wound onto a carrying roll. In order to achieve a high bending resilience, the direction of the fibers are preferably oriented longitudinally. In the areas of the desired reinforcements, one or several additional layers of fiber mats are rolled on. The carrying tube with the wound on fiber reinforcement is disposed in the mold. Following a short rotation of the mold, the fiber reinforcement unrolls and attaches itself to the interior wall of the mold. Thereafter, the synthetic resin is injected by spraying from either the bottom or top end of the pole with a free, almost straight jet in the longitudinal direction of the mold.

By changing the angle of spraying of the nozzle, the predetermined amount of synthetic resin can be exactly injected onto the fiber reinforcement in such a way that the glass fiber layers are saturated correctly according to their various thicknesses and in the desired fashion. The injection procedure can be carefully controlled by the light source on the opposite side of the mold so that undesired resin concentrations or insufficiently saturated areas of the reinforcement mats can be eliminated.

Because of the conicity of the form, the resin has a tendency to move away towards the larger diameter during rotation. By the use of a flange which is secured in front of the end of the mold, the synthetic resin is prevented from flowing out in an undesired fashion. The interior diameter of the flange corresponds to the predetermined diameter of the pole. Thus, additional flow of resin cannot collect and form cracks during polymerization.

Further embodiments of the invention have shown that it is especially advantageous if the arrangement is designed in such a way that that end of the form which carries the ring flange is surrounded by a housing in order to catch superfluous synthetic resin. This interception housing has a lateral lower drainage opening for the carrying off of the superfluous synthetic resin from the mold. By a similar arrangement it can be ascertained that the resin is carried back to the production process.

In another embodiment of the invention, the interception housing has an almost central opening for the connection to a heat blower directed towards the interior of the mold.

Following the injection, the polymerization of the pole is initiated by supplying heat. Radiation heat from the outside is used, for example, by using ceramic heating elements. By means of this outside heating element the mold can be preheated prior to the injection process. Additionally, the interior of the rotating mold is heated. This is done by a heat blower blowing warm air into the interior of the pole in an axial direction. This double heating from both the inside and outside results in a very short cycle time without the need for additional hardening devices. This heating technique furthermore promotes the shrinking of the conical pole which takes place during polymerization, and thus provides for easy removal from the mold in the longitudinal direction.

The invention finally provides for a suction housing positioned at one end of the mold surrounding the mold opening and connected to an exhaustor. It is preferable if this suction housing is positioned on the end of the mold having the smaller diameter. By means of the suction exhaustor the harmful vapors produced during polymerization can be reliably removed.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 5 is a longitudinal sectional view through the bottom end of the mold showing the mounted flange and interception housing.

FIG. 6 is a cross-sectional view taken along line VI—VI in FIG. 5 through the interception housing.

FIG. 7 is a front view of a centrifugal machine with applied mold and with laterally applied outside radiation heat.

FIG. 8 is a longitudinal sectional view through a centrifugal mold with housing and hot air blower located at the end with the larger diameter and with a suction housing located at the end with the smaller diameter of the mold.

DESCRIPTION OF THE PREFERRED EMBODIMENTS

Figure 1:
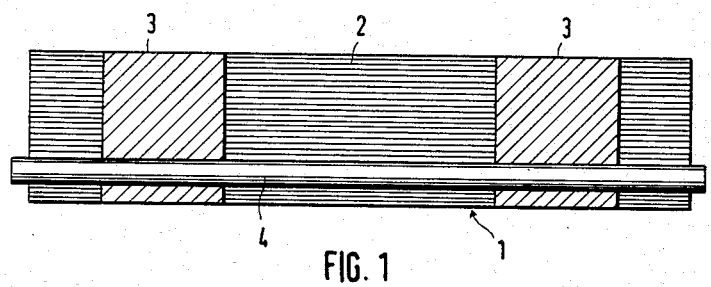
FIG. 1 is a top view of a prepared fiber reinforcement with predominantly longitudinal glass fibers and reinforcement mats placed on these and also showing a carrying tube.
Figure 2:
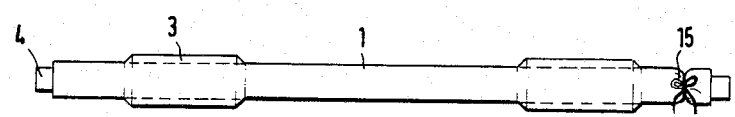
FIG. 2 is a longitudinal view of a fiber reinforcement wound onto the carrying tube with the corresponding reinforcement mats.
Figure 3:
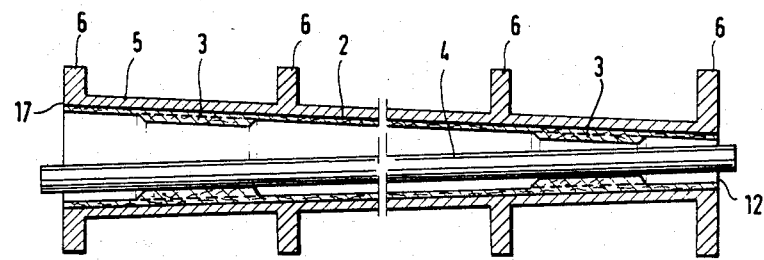
FIG. 3 is a longitudinal sectional view through a centrifugal mold with the fiber reinforcement rolled off the carrying tube immediately before the carrying tube is removed from the mold in the axial direction.
Figure 4:
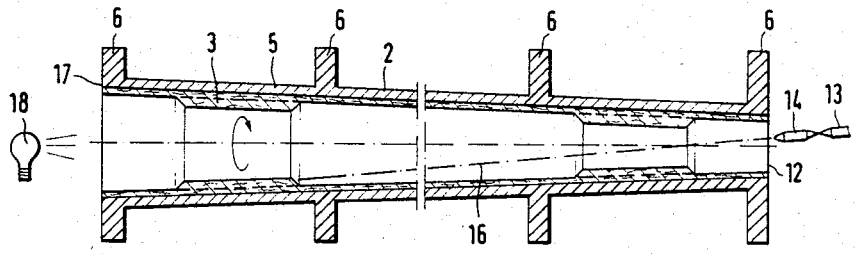
FIG. 4 is a longitudinal sectional view through the centrifugal mold with introduced fiber reinforcement and with the injection device as well as the light source arranged on the opposite side.

A fiber reinforcement 1 consists, for example, of one or more prewoven mats 2 of glass fibers extending predominantly in the longitudinal direction of the pole to be manufactured. Additional smaller fiber mats 3 are positioned at those places where an additional strengthening of reinforcement 1 is required for static or dynamic reasons. These mats 3 can be reinforced longitudinally or diagonally or randomly, according to the various demands. A carrying tube 4 is placed onto mats 2 and 3. The mats 2 and 3 are wound onto the carrying tube 4 into a longitudinal roll and fastened with a band 15 or similar fastening means as shown in FIG. 2. The entire reinforcement package is introduced into a conical mold 5 in a longitudinal direction by means of the carrying tube 4. Mold 5 is disposed on rolls 9 and 10 which are arranged on frame 7 of a centrifugal machine 8 by means of roller elements 6. Rolls 10 are then rotated by a drive 11. If mold 5 is rotated for a short time in one rotational direction, opposite to the direction of the winding of mats 2 on carrying tube 4, mats 2 and 3 will roll off from the carrying tube 4 and attach themselves onto the interior wall of the mold 5 as will be seen by comparing FIGS. 3 and 4. Reinforcement mats 3 retain their predetermined position relative to the reinforcement mats 2. Carrying tube 4 is then pulled out from mold 5 in the longitudinal direction.

A nozzle 14 connected to a supply pipe 13 is arranged on the end 12 of the mold 5, the end 12 having the smaller diameter, for the purpose of injecting synthetic resin into the interior of the mold 5. The synthetic resin is sprayed into the mold 5 by a sharp, free, almost straight jet 16. The nozzle may be arranged at the bottom end of the mold 5 as well. During this injection process, the mold 5 is rotated. A light source 18 is arranged on the front end of the mold 5 opposite to the injection nozzle 14, illuminating the interior of the mold 5 and allowing exact observation of the injection process and the saturation of the fiber reinforcement. Thus, a complete and reliable saturation process of the fiber reinforcement with the synthetic resin is assured.

A ring shaped flange 19 is fastened onto the front end 17 of the mold 5 by threaded members 20, the interior diameter 21 of the flange corresponding to the desired interior diameter of pole 22 to be manufactured. If, as a consequence of the conicity of the mold 5, an undesired high concentration of resin collects at the bottom end 17, this flows through opening 23 of flange 19 and is hurled in an outward direction by the centrifugal force.

This flow of excessive resin, as indicated by arrow 24, is caught by interception housing 25 and carried off through lateral opening 26.

Radiation heat elements 27 are arranged laterally on the frame 7 of the centrifugal machine 8 for heating of the exterior mantle of the mold 5. Mold opening 12 receives a suction housing 28, as shown in FIG. 8, following removal of injection nozzle 14. The housing 28 surrounds the end of the mold and has a connecting piece 29 for connection to an exhaustor 30. Interception housing 25 arranged on the other side has an approximately central opening 31 through which the nozzle 32 of a heat blower 33 extends. In this way, hot air 34 is blown into the interior of the mold 5 in an axial direction and carried throughout the mold 5 in a longitudinal direction by the pressure of blower 33 and the negative pressure produced by the exhaustor 30 in suction housing 28. Harmful vapors produced during polymerization of the synthetic resin are carried along by the hot air 34 and transported to the outside by suction housing 28.

What we claim is:

1. Apparatus for manufacturing conical hollow poles of fiber reinforced synthetic resin comprising an elongated mold having an interior surface receiving a fiber reinforcement, said interior surface of said elongated mold being a generally conical surface, injection nozzle means disposed at one longitudinal end of said mold for introducing synthetic resin generally longitudinally into said elongated mold, a light source disposed at one longitudinal end of said mold for illuminating the interior of said mold, ring means mounted on the longitudinal end of said mold having the larger interior diameter, said ring means having an inner diameter corresponding to the interior diameter of said conical hollow pole at the larger diameter bottom of said conical hollow pole, whereby excess resin passes out of said elongated mold past said ring means, and a first housing disposed about the longitudinal end of said mold and said ring means for receiving said excess synthetic resin.

2. Apparatus for manufacturing conical hollow poles of fiber reinforced synthetic resin according to claim 1 wherein said ring means comprise a ring flange, and fastener devices fastening said ring flange to the longitudinal end of said mold, said ring flange being concentrically disposed on said mold.

3. Apparatus for manufacturing conical hollow poles of fiber reinforced synthetic resin according to claim 2 wherein said first housing has a lateral discharge opening for discharging said excess synthetic resin from said first housing.

4. Apparatus for manufacturing conical hollow poles of fiber reinforced synthetic resin according to claim 2 wherein said first housing has an inlet opening and heating means for introducing a heating medium into said mold through said inlet opening.

5. Apparatus for manufacturing conical hollow poles of fiber reinforced synthetic resin according to claim 4 wherein said inlet opening is aligned with the longitudinal axis of said elongated mold.

6. Apparatus for manufacturing conical hollow poles of fiber reinforced synthetic resin according to claim 3 further comprising a second housing disposed about the longitudinal end of said mold opposite the longitudinal end about which said first housing is disposed.

7. Apparatus for manufacturing conical hollow poles of fiber reinforced synthetic resin according to claim 6 further comprising exhausting means on said second housing for exhausting gaseous media from said second housing.

8. Apparatus for manufacturing conical hollow poles of fiber reinforced synthetic resin according to claim 1 further comprising means for rotating said mold around its longitudinal axis.

9. Apparatus for manufacturing conical hollow poles of fiber reinforced synthetic resin according to claim 8 wherein said elongated mold is open on at least one longitudinal end for permitting introduction into said mold of an elongated carrying tube about which fiber reinforcement is wound, said fiber reinforcement being unwound upon rotation of said mold to be disposed against said interior surface of said mold, said injection nozzle introducing said synthetic resin into said mold to saturate said fiber reinforcement disposed on the interior surface of said mold.

10. Apparatus for manufacturing conical hollow poles of fiber reinforced synthetic resin according to claim 1 further comprising heating means disposed externally of said mold for heating the outside of said mold.

* * * * *